United States Patent
Matsuda et al.

(10) Patent No.: US 9,280,649 B2
(45) Date of Patent: Mar. 8, 2016

(54) APPARATUS AND METHOD FOR DETECTING AN OBJECT FROM AN IMAGE

(71) Applicant: FUJITSU LIMITED, Kawasaki-shi (JP)

(72) Inventors: Takahiro Matsuda, Isehara (JP); Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 416 days.

(21) Appl. No.: 13/667,494

(22) Filed: Nov. 2, 2012

(65) Prior Publication Data

US 2013/0148850 A1 Jun. 13, 2013

(30) Foreign Application Priority Data

Dec. 13, 2011 (JP) ................................. 2011-272518

(51) Int. Cl.
 *G06K 9/00* (2006.01)
 *G06F 21/32* (2013.01)
 *G06K 9/46* (2006.01)
 *G06K 9/62* (2006.01)
 *G06K 9/66* (2006.01)
 *G06K 9/32* (2006.01)

(52) U.S. Cl.
 CPC ............ *G06F 21/32* (2013.01); *G06K 9/00362* (2013.01); *G06K 9/4642* (2013.01); *G06K 9/6212* (2013.01); *G06K 9/66* (2013.01); *G06F 2221/2139* (2013.01); *G06K 9/00295* (2013.01); *G06K 2009/3291* (2013.01); *G06K 2009/6213* (2013.01)

(58) Field of Classification Search
 CPC ............... H04N 21/44218; G06T 2207/30201; G06K 9/46; G06K 9/62
 See application file for complete search history.

(56) References Cited

U.S. PATENT DOCUMENTS

| | | | |
|---|---|---|---|
| 2002/0012449 A1* | 1/2002 | Bradski | 382/103 |
| 2002/0081026 A1* | 6/2002 | Izume et al. | 382/170 |
| 2005/0089223 A1* | 4/2005 | Krumm | 382/170 |
| 2008/0049985 A1* | 2/2008 | Wang et al. | 382/118 |
| 2009/0027502 A1* | 1/2009 | Yang | 348/169 |

(Continued)

FOREIGN PATENT DOCUMENTS

WO 01/38356 A2 5/2001

OTHER PUBLICATIONS

Khan et al., Biometric Driven Initiative System for Passive Continuous Authentication, Dec. 2011, 7th International Conference on Information Assurance and Security (IAS), pp. 139-144.*

(Continued)

*Primary Examiner* — Vu Le
*Assistant Examiner* — Guillermo Rivera-Martinez
(74) *Attorney, Agent, or Firm* — Staas & Halsey LLP

(57) ABSTRACT

A user detecting apparatus includes: a memory; and a processor that executes a procedure, the procedure including: obtaining a first image and a second image, extracting a user-associated area from the first image according to a given condition, dividing the user-associated area into a plurality of areas, storing a histogram of each of the plurality of areas in the memory, detecting from the second image a corresponding area that corresponds to an area that is one of the plurality of areas and has a first reference histogram according to similarity, and changing a reference histogram used for a third image from the first reference histogram to a second reference histogram.

18 Claims, 16 Drawing Sheets

(56) References Cited

U.S. PATENT DOCUMENTS

2010/0067741 A1* 3/2010 Stolkin et al. ............... 382/103
2013/0051632 A1* 2/2013 Tsai et al. ................... 382/118

OTHER PUBLICATIONS

Niinuma et al., Soft Biometric Traits for Continuous User Authentication, Nov. 2010, IEEE Transactions on Information Forensics and Security, vol. 5, No. 4, pp. 771-780—furnished via IDS.*

Stolkin et al., Continuous Machine Learning in Computer Vision—Tracking with Adaptive Class Models, Jun. 2007, Scene Reconstruction, Pose Estimation and Tracking, ISBN 978-3-902613-06-6, pp. 265-282.*

Extended European Search Report mailed Mar. 5, 2013 for corresponding European Application No. 12191223.2.

Paul Viola et al., "Rapid Object Detection Using a Boosted Cascade of Simple Features", in Proceedings of the 2001 IEEE Computer Vision and Pattern Recognition, 2001, pp. I_511-I_518.

Koichiro Niinuma et al., "Soft Biometric Traits for Continuous User Authentication", IEEE Transactions on Information Forensics and Security, vol. 5, No. 4, Dec. 2010, pp. 771-780.

B.D. Lucas et al., "An Iterative Image Registration Technique with an Application to Stereo Vision", in Proc. $7^{th}$ IJCAI, Vancouver, B.C., Canada, Aug. 24-48, 1981 pp. 674-679.

* cited by examiner

FIG. 7

| STORED DATA NO. | AREA |
| --- | --- |
| AREA OF STORED DATA 1 | ENTIRE FACE AREA |
| AREA OF STORED DATA 2 | LEFT SIDE OF FACE AREA |
| AREA OF STORED DATA 3 | RIGHT SIDE OF FACE AREA |
| AREA OF STORED DATA 4 | ENTIRE BODY AREA |
| AREA OF STORED DATA 5 | LEFT SIDE OF BODY AREA |
| AREA OF STORED DATA 6 | RIGHT SIDE AREA OF AREA |
| AREA OF STORED DATA 7 | HEAD AREA |

AREA OF STORED DATA 1

AREA OF STORED DATA 3

FIG. 10

| STORED DATA NO. | AREA | AREA SIZE |
| --- | --- | --- |
| AREA OF STORED DATA 1 | ENTIRE FACE AREA | 30 |
| AREA OF STORED DATA 2 | LEFT SIDE OF FACE AREA | 15 |
| AREA OF STORED DATA 3 | RIGHT SIDE OF FACE AREA | 15 |
| AREA OF STORED DATA 4 | ENTIRE BODY AREA | 50 |
| AREA OF STORED DATA 5 | LEFT SIDE OF BODY AREA | 25 |
| AREA OF STORED DATA 6 | RIGHT SIDE AREA OF AREA | 25 |
| AREA OF STORED DATA 7 | HEAD AREA | 10 |

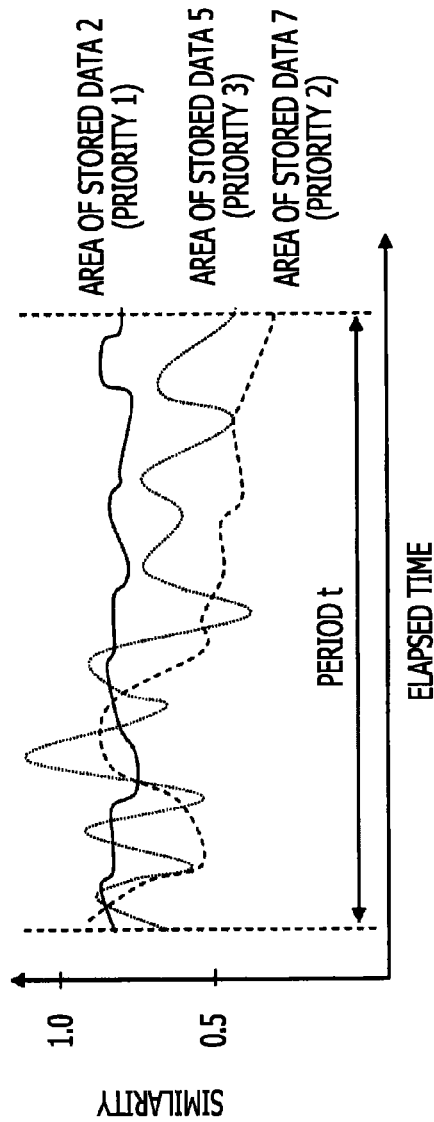

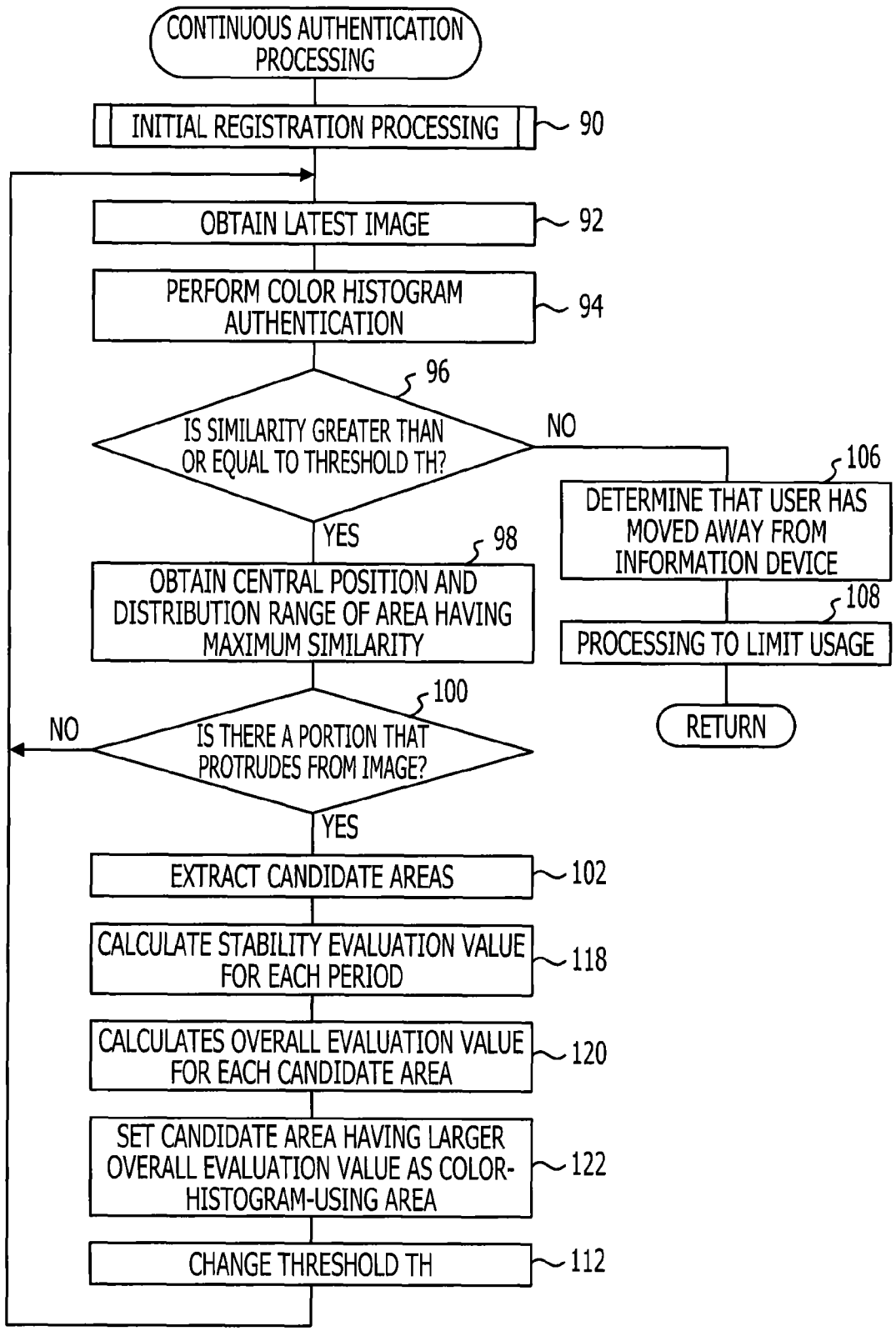

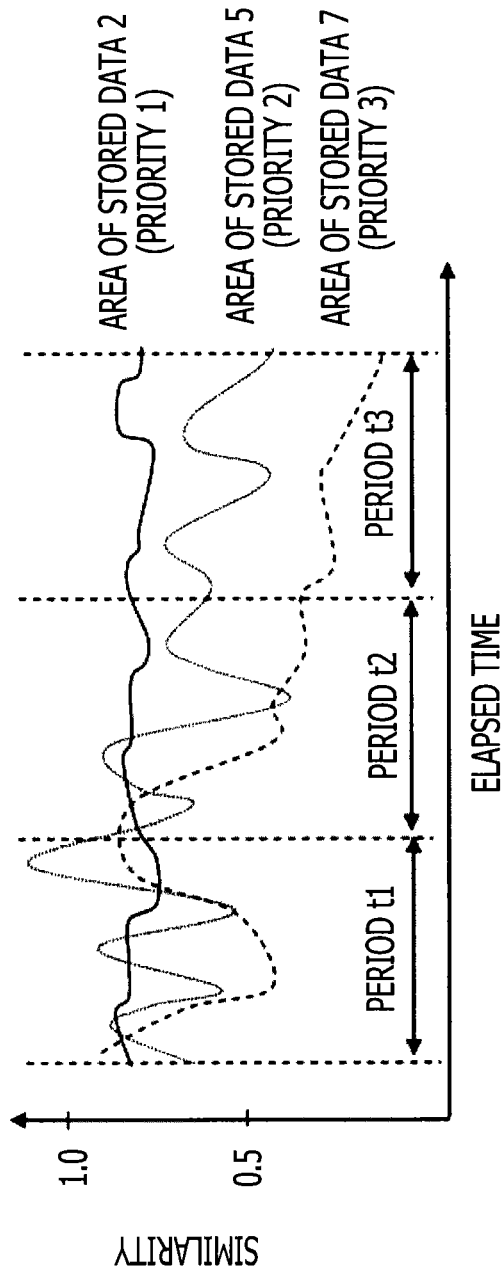

APPARATUS AND METHOD FOR DETECTING AN OBJECT FROM AN IMAGE

CROSS-REFERENCE TO RELATED APPLICATION

This application is based upon and claims the benefit of priority of the prior Japanese Patent Application No. 2011-272518, filed on Dec. 13, 2011, the entire contents of which are incorporated herein by reference.

FIELD

The embodiments discussed herein are related to a user detecting apparatus, a user detecting method, and a computer readable recording medium storing a user detecting program.

BACKGROUND

As information devices have rapidly come into widespread use, a wide variety of types of information has come to be stored in information devices in recent years. Accordingly, a very important issue is to establish a security technology that suppresses, for example, information from leaking from information devices. In view of the above situation, various authentication technologies have been proposed and are being implemented. Authentication technology is technology that uses, for example, password authentication, biometric authentication, card authentication, or the like. However, many existing authentication technologies carry out authentication only at login, so they have the common problem that if, for example, a third party has unauthorized access to an information device while a legitimate user is away from the location at which the information device is installed, the unauthorized access is difficult to detect.

To address the above problem, continuous authentication technologies have been proposed in which the user is subject to continuous authentication even after the user has logged in K. Niinuma, U. Park, A. K. Jain, "Soft Biometric Traits for Continuous User Authentication", IEEE Transactions on Information Forensics and Security, Vol. 5, No. 4, pp. 771-780, 2010, P. Viola and M. Jones, "Rapid object detection using a boosted cascade of simple features", in Proc. IEEE Computer Vision and Pattern Recognition, pp. I_511-I_518, 2001 and B. D. Lucas and T. Kanade, "An iterative image registration technique with an application to stereo vision", in Proc. 7th IJCAI, Vancouver, B. C., Canada, pp. 674-679, 1981.

Color histogram authentication, which is a continuous authentication technology that uses color histograms of an image on which a user is pictured, has the advantage that robust continuous authentication is possible for changes in the orientation of the user in comparison with face authentication and other methods in which key strokes or the like is used. In color histogram authentication, the color histogram of an area associated with a user on an image is registered and the user-associated area on an image is detected according to color histogram similarity with the registered color histogram, for example. Color histogram enables continuous authentication by tracking the movement of the user-associated area.

SUMMARY

According to an aspect of the invention, a user detecting apparatus includes: a memory that stores a program including a procedure; and a processor that executes the program, the procedure including: obtaining a first image captured by a camera and a second image captured after the first image has been captured, extracting a user-associated area, which is associated with a user, from the first image according to a given condition, dividing the user-associated area into a plurality of areas, storing a histogram of each of the plurality of areas in the memory, detecting from the second image a corresponding area that corresponds to an area that is one of the plurality of areas and has a first reference histogram, which is one of the color histograms of the plurality of areas, according to similarity between the first reference histogram and a color histogram involved in the second image, and changing a reference histogram used for a third image, which is captured after the second image is captured, from the first reference histogram to a second reference histogram.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a table illustrating an example of reference color histogram information according to the first embodiment;

FIG. 10 is a table illustrating an example of reference color histogram information in a second embodiment;

FIG. 14A is a graph illustrating an example of trends of color histogram similarity, and FIG. 14B is a table illustrating an example of calculation results of stability evaluation values;

FIG. 15 is a flowchart of continuous authentication processing described in a fourth embodiment; and FIG. 16A is a graph illustrating an example of trends of color histogram similarity, and FIG. 16B is a table illustrating an example of calculation results of stability evaluation values.

DESCRIPTION OF EMBODIMENTS

When detecting the user-associated area by using color histograms, for example, if a situation is assumed in which the position of the user-associated area moves to an edge of the image and part of the user-associated area protrudes past a boundary of the image, the similarity of the color histogram may be lowered. Accordingly, if the position of the user-associated area moves to an end of the image, precision with which the user-associated area is detected is lowered.

If detection precision is lowered, in spite of the user being present, the user-associated area may possibly not be detected and thereby authentication may be discontinued or the user may be mistakenly determined to have moved away from the information device. Particularly, if a photograph unit installed on a personal computer (PC) is used in continuous authentication, when the user moves, the user-associated area protrudes beyond the photograph range due to the small angle of view of the photograph unit. The photograph unit is, for example, a web camera used in a web conference or the like; the field angle of a web camera is only about twice the width of the user's body.

If the user is mistakenly determined to have moved away from the information device in continuous authentication, the continuous authentication fails and processing such as, for example, processing to lock the screen of the PC is executed. Accordingly, the user is desired to restrict the motion of the body so that the body of the user does not largely protrude beyond the photograph range. This is an obstacle for the user to use the PC with ease. Although a wide-angle camera may be used as the photograph unit, another problem arises: to use an existing PC in continuous authentication, replacing the camera and the like is desirable.

An aim of the technology in the present disclosure is to suppress a drop in precision with which the user-associated area is detected.

Examples of embodiments of a technology in the present disclosure will be described in detail with reference to the drawings.

First Embodiment

Figure 1:
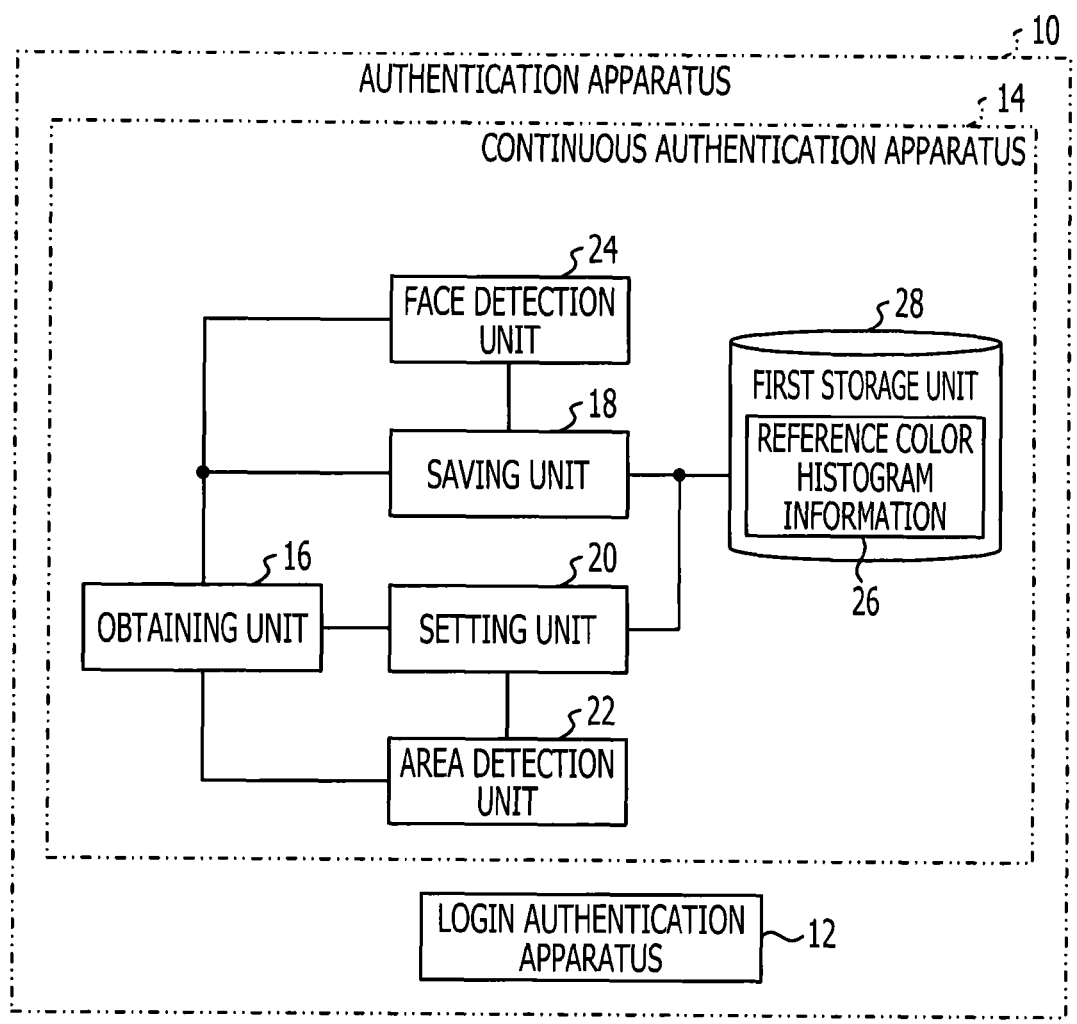
FIG. 1 is a functional block diagram of an authentication apparatus described in a first embodiment.

FIG. 1 is a functional block diagram of an authentication apparatus 10 according to a first embodiment. The authentication apparatus 10 authenticates a user who uses an information device such a PC or a mobile terminal. The authentication apparatus 10 includes a login authentication apparatus 12 that performs login authentication for a user who starts using the information device and also includes a continuous authentication apparatus 14 that performs continuous authentication for a user who is using the information device.

The authentication apparatus 10 is built into, for example, an information device that is used by the user. In this case, the information device also functions as the authentication apparatus 10. The authentication apparatus 10 may be a computer connected to an information device through a communication link. The login authentication apparatus 12 may have a structure in which any of various known authentication methods are used as a user authentication method. Examples of authentication methods include password authentication, biometric authentication, and card authentication.

The continuous authentication apparatus 14, which is an example of a user detecting apparatus in the technology in the present disclosure, includes an obtaining unit 16, a saving unit 18, a setting unit 20, an area detection unit 22, a face detection unit 24, and a first storage unit 28. The first storage unit 28 stores reference color histogram information 26.

The obtaining unit 16 periodically obtains image data of an image captured by taking a picture of the face and part of the body of a user to be authenticated and the background of the user. The user to be authenticated is the user who succeeds in login authentication executed by the login authentication apparatus 12 and is currently using the information device. Images are captured by the photograph unit.

When the authentication apparatus 10 is built into the information device, for example, the obtaining unit 16 may include the photograph unit. For example, when a computer connected to the information device through a communication link functions as the authentication apparatus 10, the obtaining unit 16 receives image data of an image captured by the photograph unit provided in the information device. In this case, the obtaining unit 16 may be a communication unit.

Upon successful login authentication, the saving unit 18 calculates the color histogram of a face area corresponding to the face of the user on the image and also calculates the color histogram of a body area corresponding to the body of the user. For example, the saving unit 18 performs this color histogram calculation immediately after successful login authentication.

The saving unit 18 also divides each of the face area and body area into a plurality of areas and further calculates a color histogram for each divided area.

The saving unit 18 stores the calculated color histograms of the face area and body area in the first storage unit 28 as the reference color histogram information 26. The area associated with one color histogram stored in the first storage unit 28 will be referred to below as a registration area.

The setting unit 20 selects, from the registration areas stored in the first storage unit 28, a registration area to be used in color histogram authentication executed by the area detection unit 22. The registration area to be used in color histogram authentication will be referred to below as the color-histogram-using area. Color histogram authentication is described below.

If an area, on the image, that is associated with a color-histogram-using area protrudes beyond a boundary of the image, the setting unit 20 changes the color-histogram-using area.

The area detection unit 22 carries out color histogram authentication for an image obtained by the obtaining unit 16. Specifically, the area detection unit 22 uses the color histogram of the color-histogram-using area as the reference color histogram to detect the user-associated area on the image.

For example, the area detection unit 22 divides a newly obtained image into a plurality of areas and calculates similarity between the color histogram of each area and the reference color histogram. The area detection unit 22 then searches the new image for an area having maximum similarity.

If the similarity of the color histogram of the searched-for area is greater than or equal to a threshold th, the area detection unit 22 determines that the user is present in the searched-for area. If the similarity of the color histogram is less than the threshold th, the area detection unit 22 determines that the user has moved away from the information device.

Upon successful login authentication, the face detection unit 24 detects the face area corresponding to the face of the user on the image and then extracts the detected face area from the image. For example, the face detection unit 24 performs the extraction on, the image obtained immediately after successful login authentication.

The face detection unit 24 outputs the extracted face area to the saving unit 18 as a detection result. The face area detection result output from the face detection unit 24 to the saving unit 18 is used by the saving unit 18 to identify the face area and body area on the image.

Figure 2:
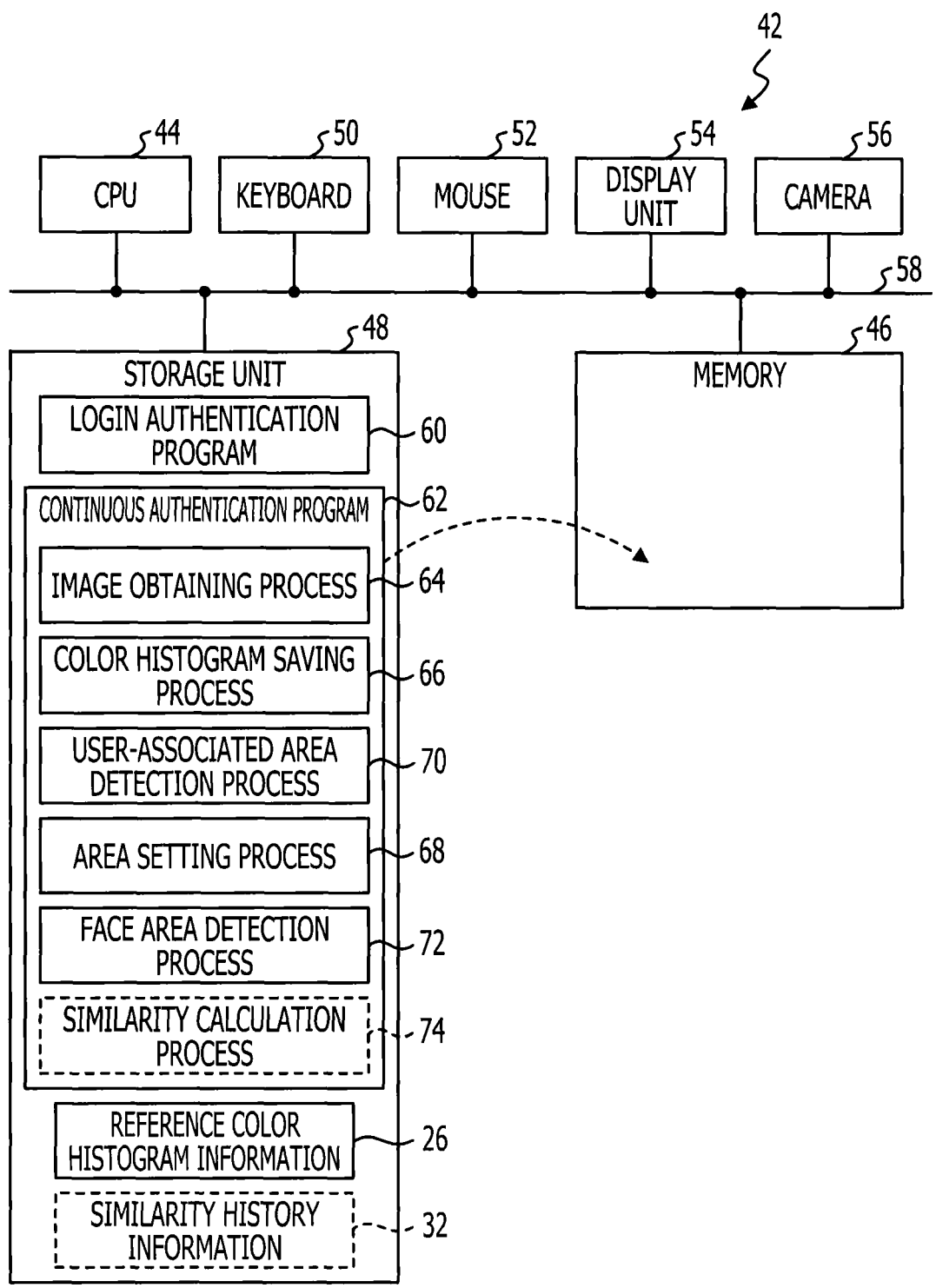
FIG. 2 is a schematic block diagram of a computer that functions as an authentication apparatus.

The authentication apparatus 10 may be implemented by, for example, a computer 42 illustrated in FIG. 2. An aspect in which the computer 42 is included in the information device used by the user is described below. However, the computer 42 may be connected to the information device through a communication link.

The computer 42 includes a central processing unit (CPU) 44, a memory 46, a storage unit 48 that is non-volatile, a keyboard 50, a mouse 52, a display unit 54, and a camera 56.

These components are mutually connected through a bus 58. The camera 56 is an example of the photograph unit. The camera 56 is disposed so that it may take pictures of the face and part of the body of the user who is currently using the information device as well as the background of the user.

The storage unit 48 may be implemented by a hard disk drive (HDD), a flash memory, or the like. The storage unit 48, which includes a recording medium, stores a login authentication program 60, a continuous authentication program 62, and the reference color histogram information 26, which are used to have the computer 42 to function as the authentication apparatus 10. The CPU 44 reads out the login authentication program 60 and continuous authentication program 62 from the storage unit 48, stores them in the memory 46, and sequentially executes processes included in the login authentication program 60 and continuous authentication program 62.

The CPU 44 executes processes in the login authentication program 60 to function as the login authentication apparatus 12 illustrated in FIG. 1. The continuous authentication program 62 includes an image obtaining process 64, a color histogram saving process 66, an area setting process 68, a user-associated area detection process 70, and a face area detection process 72. The CPU 44 executes the image obtaining process 64 to function as the obtaining unit 16 illustrated in FIG. 1. The CPU 44 executes the color histogram saving process 66 to function as the first authentication unit 18 illustrated in FIG. 1. The CPU 44 executes the area setting process 68 to function as the setting unit 20 illustrated in FIG. 1. The CPU 44 executes the user-associated area detection process 70 to function as the area detection unit 22 illustrated in FIG. 1. The CPU 44 executes the face area detection process 72 to function as the notification unit 24 illustrated in FIG. 1. The continuous authentication program 62 is an example of the user detecting program in the technology in the present disclosure.

When the authentication apparatus 10 is implemented by the computer 42, the storage unit 48, which stores the reference color histogram information 26, is used as the first storage unit 28, in which case a partial area of the memory 46 is used as a storage area that stores the reference color histogram information 26. Thus, after having executed the login authentication program 60 and continuous authentication program 62, the computer 42 functions as the authentication apparatus 10.

The authentication apparatus 10 may be implemented by, for example, a semiconductor integrated circuit, more specifically an application-specific integrated circuit (ASIC) or the like.

Next, the effect of the first embodiment is described. With the conventional color histogram authentication method, robust continuous authentication may be possible in response to changes in the orientation of the target user who is to be authenticated, as described above. However, if part of the user-associated area protrudes beyond a boundary of the image in the conventional color histogram authentication method, the color histogram similarity is lowered. Precision with which the user-associated area is detected is thereby lowered, so in spite of the user being present, the user-associated area may possibly not be detected and thereby authentication may be discontinued or the user may be mistakenly determined to have moved away from the information device.

In this embodiment, in addition to the color histograms of the overall face area and the overall body area, the color histogram of each of a plurality of areas into which the face area and body area are divided is also stored in the first storage unit 28 as the reference color histogram information 26. If at least part of an area, which is used as the color-histogram-using area, in the user-associated area protrudes beyond a boundary of the mage, the color-histogram-using area is changed to another registered area. The other registered area is an area that is either within the boundaries of the image or is an area that protrudes beyond a boundary of the image but the proportion of the protruding portion is small.

Figure 3:
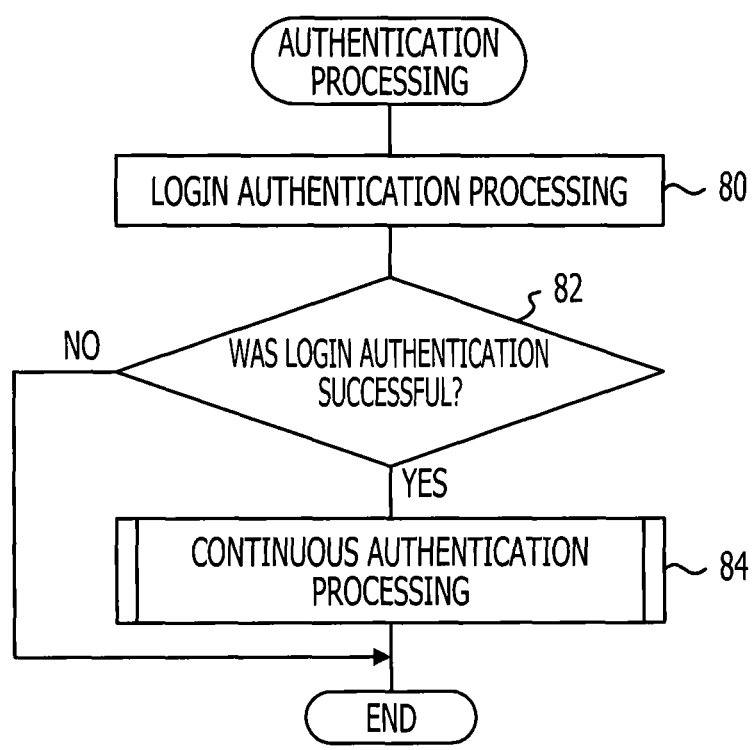
FIG. 3 is a flowchart of authentication processing.

First, authentication processing by the authentication apparatus 10 according to this embodiment is described below with reference to the flowchart in FIG. 3. Authentication processing in FIG. 3 is executed when the user to be authenticated starts to use the information device. First, the login authentication apparatus 12 carries out login authentication processing in step 80. The authentication method used in the login authentication processing may be any of various known authentication methods. The login authentication apparatus 12 then determines in step 82 whether the user has been confirmed as a legitimate user through login authentication.

If the determination in step 82 is negative, the authentication apparatus 10 terminates the authentication processing. Thereby persons other than a legitimate user may be prevented from using the information device.

If the determination in step 82 is affirmative, the login authentication apparatus 12 activates the continuous authentication apparatus 14, after which the sequence proceeds to step 84, where the continuous authentication apparatus 14 carries out continuous authentication processing. Thus, the user who has been confirmed as a legitimate user through login authentication may use the information device while the continuous authentication apparatus 14 performs continuous authentication processing.

Continuous authentication processing carried out by the continuous authentication apparatus 14 in step 84 in authentication processing illustrated in FIG. 3 will be described in detail with reference to FIG. 4. In continuous authentication processing displayed in FIG. 4, initial registration processing is first carried out in step 90.

Figure 5:
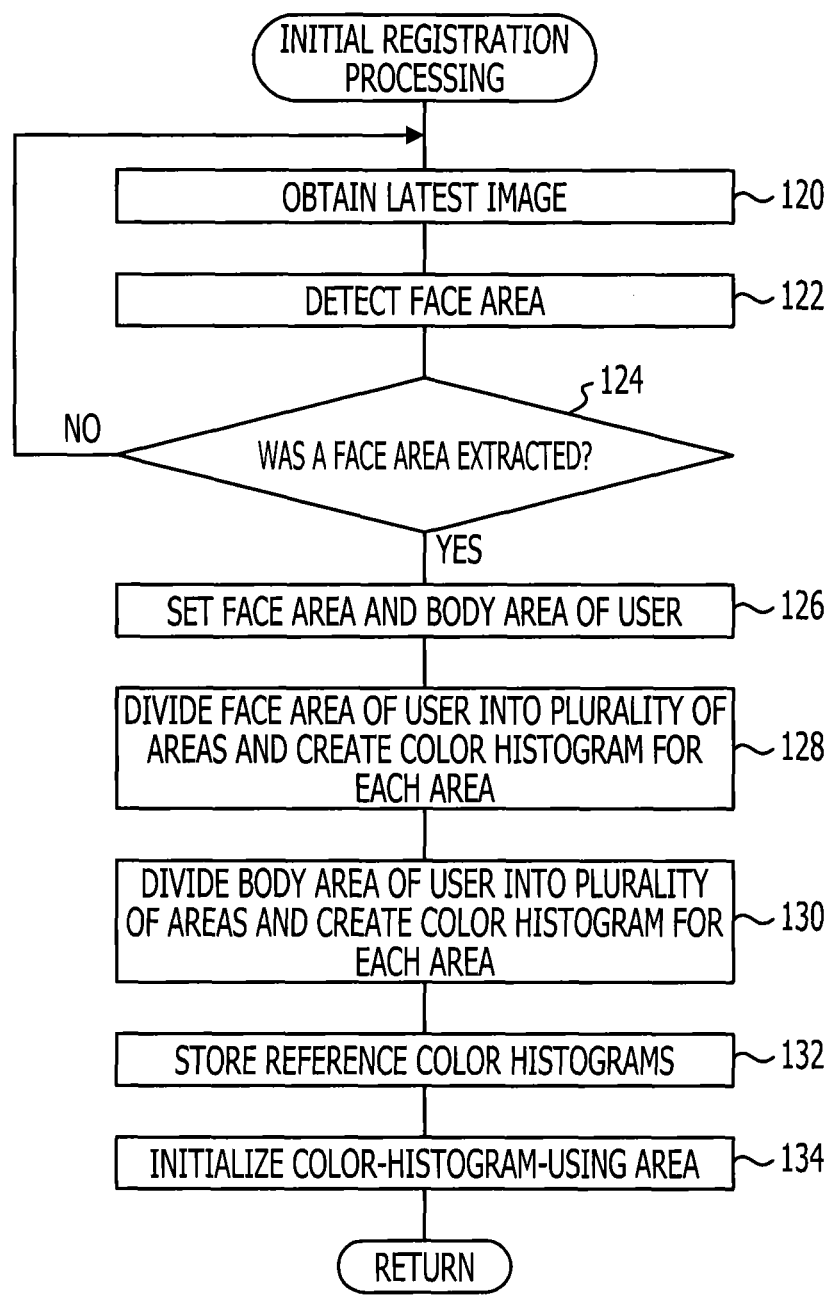
FIG. 5 is a flowchart of initial registration processing.

Initial registration processing will be described with reference to FIG. 5. FIG. 5 is a flowchart of initial registration processing.

First, in step 120, the obtaining unit 16 obtains image data of the latest image captured by the photograph unit. In step 122, the face detection unit 24 detects the face area of the user, which is present on the image represented by the image data obtained by the obtaining unit 16.

To detect the face area, the face detection unit 24 may use any method such as, for example, a method in which a Haar classifier is employed. A method in which a Haar classifier is employed is disclosed in P. Viola and M. Jones, "Rapid object detection using a boosted cascade of simple features", in Proc. IEEE Computer Vision and Pattern Recognition, pp. I_511-I_518, 2001.

In step 124, the face detection unit 24 then determines whether a face area corresponding to the face of the user has been extracted as the result of face area detection in step 132. If, for example, the face of the user did not face forwards during photography, the decision in step 124 becomes negative. The sequence then returns to step 120. Steps 120 to 124 are repeated until the determination in step 124 becomes affirmative.

If the determination in step 124 is affirmative, the sequence proceeds to step 126, where the saving unit 18 sets a face area having a fixed shape that substantially corresponds to the face of the user, according to the result of face area detection by the face detection unit 24. The fixed shape is, for example, an ellipse shape or another shape.

The saving unit 18 also sets, below the set face area, a body area having a fixed shape that substantially corresponds to part of the body of the user. The fixed shape is, for example, a rectangular shape or another shape.

Figure 6:
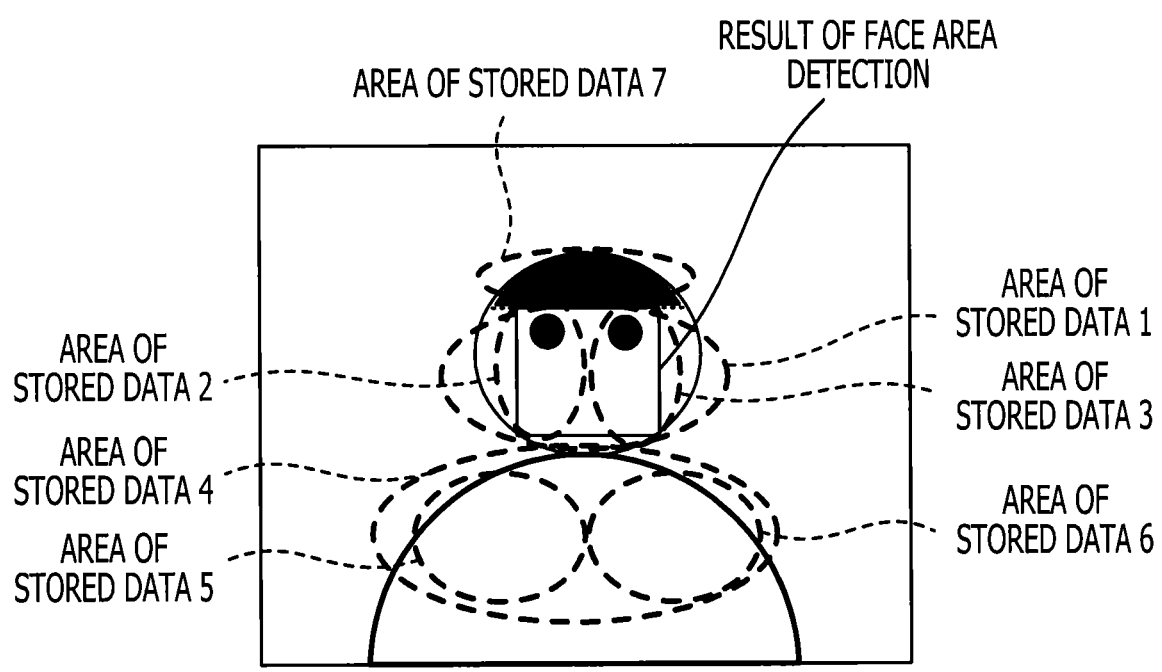
FIG. 6 is a conceptual drawing illustrating an example of an area color histogram that is registered.

It is also possible to use another method to set the body area. In FIG. 6, an example of a face area detection result is indicated as "result of face area detection", an example of the face area set by the saving unit 18 is indicated as "area of stored data 1", and an example of the body area is indicated as "area of stored data 4".

In step 128, the saving unit 18 divides the face area of the user, which has been set in step 126, into a plurality of areas and creates a color histogram for each of all the areas including the overall face area. In FIG. 6, for example, the face area is divided into an area on the left side and an area on the right side. The area on the left side of the face area is "area of stored data 2" in FIG. 6. The area on the right side of the face area is "area of stored data 3" in FIG. 6.

In FIG. 6, the saving unit 18 adds a new area to the upper portion of the detected face area as a head area. The area corresponding to the head area is indicated as "area of stored data 7".

That is, in the example in FIG. 6, a color histogram is created for each of stored data 1 to stored data 3 and stored data 7. Although the face area has been divided into an area on the left side and an area on the right side, this is not a limitation; for example, the face area may be divided into an upper area and a lower area. As another example, the face area may be divided into four areas: upper-left area, lower-left area, upper-right area and lower-right area.

In step 130, the saving unit 18 divides the body area, which has been set in step 126, into a plurality of areas and creates a color histogram for each of the areas including the overall body area. In FIG. 6, for example, the body area is divided into an area on the left side and an area on the right side. The area on the left side of the body area is "area of stored data 5" in FIG. 6. The area on the right side of the body area is "area of stored data 6" in FIG. 6.

That is, in the example in FIG. 6, a color histogram is created for each of stored data 4 to stored data 6. Although the body area has also been divided into an area on the left side and an area on the right side, this is not a limitation; for example, the body area may be divided into an upper area and a lower area. As another example, the body area may be divided into four areas: upper-left area, lower-left area, upper-right area and lower-right area.

When, for example, the obtaining unit 16 obtains image data that represents the colors of each pixel in an image with a combination of three colors, red, green and blue (RGB), each color histogram created in steps 128 and 130 represents a frequency of each of the three colors, RGB, for each three-color combination. It is also possible to use a color space other than the RGB color space.

In step 132, the saving unit 18 stores the color histogram for each area, which were created in steps 128 and 130, in the first storage unit 28 as the reference color histogram information 26.

The color histogram for each registration area, which is stored in the first storage unit 28 as the reference color histogram information 26, is assigned information that indicates the portion, in the user-associated area, to which the relevant registration area corresponds, as illustrated in FIG. 7. Each area in FIG. 7 indicates information that indicates the portion, in the user-associated area, to which the relevant registration area corresponds.

The saving unit 18 also stores information that represents the position and size of the face area of the user, which was set in step 126, in the first storage unit 28 as part of the reference color histogram information 26.

In step 134, the setting unit 20 initializes a given area as the color-histogram-using area to be used in color histogram authentication, concluding initial registration processing. The entire face area, for example, may be used as the given area. However, this is not a limitation; for example, multiple areas that include both the overall area and the overall body area may be used. Alternatively, for example, one area selected from the face area and one area selected from the body area may be used. When an area with a larger size is set, precision with which the user-associated area is detected may be improved. For example, the overall face area or a combination of the overall face area and the overall body area is preferably used.

Figure 4:
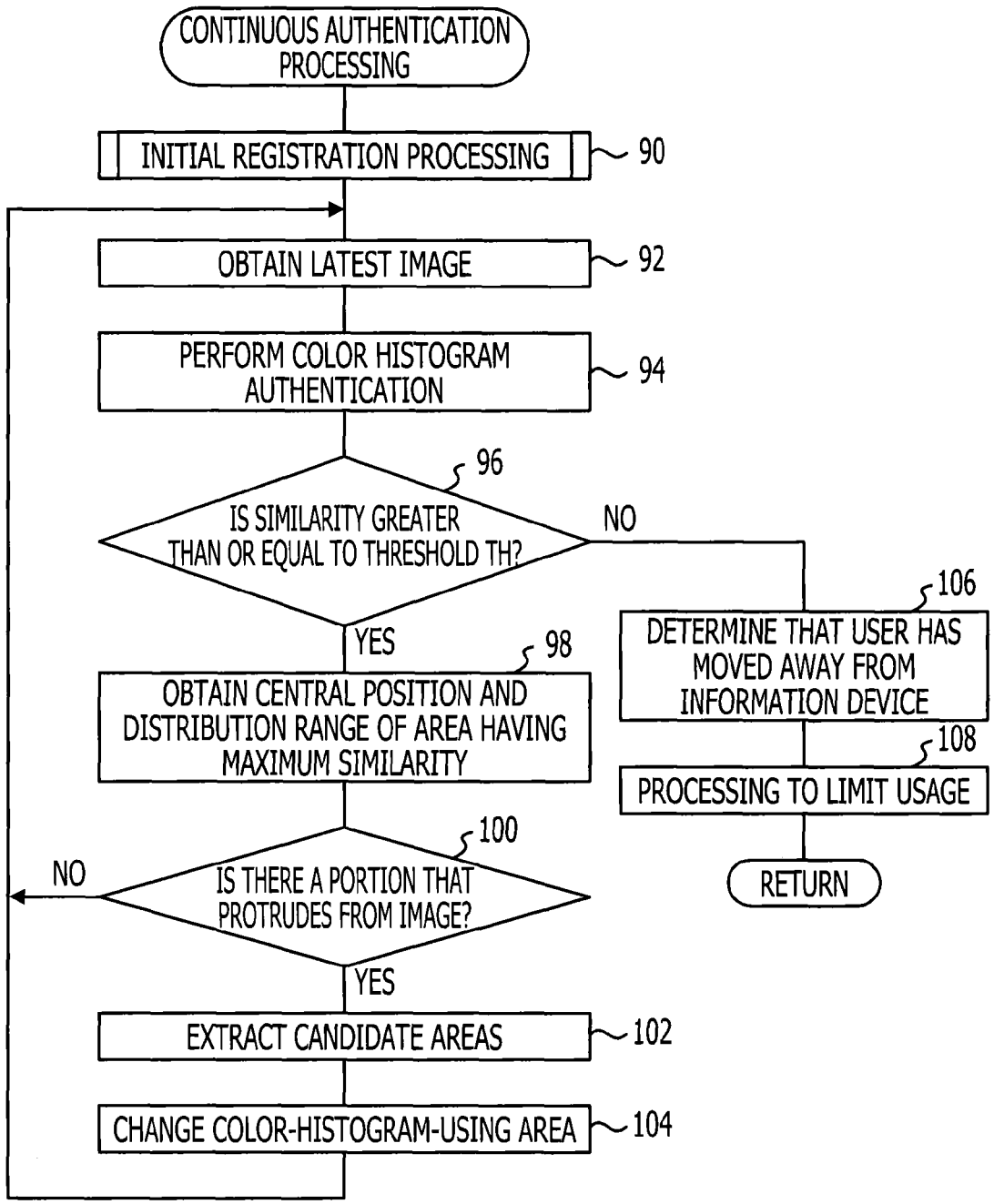
FIG. 4 is a flowchart of continuous authentication processing described in the first embodiment.

Upon conclusion of the initial registration processing described above, the sequence proceeds to step 92 in continuous authentication processing in FIG. 4. In step 92, the obtaining unit 16 obtains image data of a new image captured by the photograph unit. In step 94, the area detection unit 22 uses the color histogram in the color-histogram-using area to perform color histogram authentication for the image, the image data of which was obtained by the obtaining unit 16.

Specifically, the area detection unit 22 first obtains information about the face area of the user from the reference color histogram information 26 stored in the first storage unit 28. The information about the face area of the user is, for example, the position and size of the user area.

The area detection unit 22, using the position and size of the obtained face area as a reference, then sets a search range in which the color-histogram-using area is searched for, according to the positional relationship between the obtained face area and the color-histogram-using area, and to the ratio in size therebetween.

For example, if the color-histogram-using area that has been set is the overall face area, the area detection unit 22 sets the face area, the position and size of which have been obtained, as well as areas around the face area as the search range, with the face area as the center of the search area. If, for example, the color-histogram-using area that has been set is a left-side area in the face area, the area detection unit 22 extracts a left-side area from the face area from which the position and size have been extracted, and sets the extracted left-side area and areas around it as the search range, with the extracted left-side area as the center of the search range.

Next, the area detection unit 22 calculates the similarity of the color histogram of the obtained image with the color histogram of the color-histogram-using area, for an area that is present in the set search range and is eligible for calculation. The color histogram of the color-histogram-using area is referred to below as the reference color histogram.

Each time the above calculation is completed, the area eligible for calculation is changed within the set search range and the calculation is repeated. The area detection unit 22 selects an area in which the color histogram similarity with the reference color histogram is maximized as a candidate user-associated area. A candidate user-associate area is a candidate area for the color-histogram-using area.

If one registration area in the face area and one registration area in the body have been set as the color-histogram-using area, the area detection unit 22 carries out the above processing for the body area as well, that is, selecting a candidate area in which the color histogram similarity with the reference color histogram is maximized.

The area detection unit 22 then calculates a final similarity Sfinal from the similarity Sface of the color histogram of the face area and the similarity Sbody of the color histogram of the body area according to equation (1) below.

$$Sfinal = w \times Sface + (1-w) \times Sbody \qquad (1)$$

"w" is a weighting factor for the similarity Sface between the color histogram of the face area and the corresponding reference color histogram; the value of w is at least 0 and at most 1.

In step 96, the area detection unit 22 determines whether the color histogram similarity obtained in step 94 is greater than or equal to a threshold TH, which has been set in advance If the determination in step 96 is affirmative, the area detection unit 22 determines that the user is present in the color-histogram-using area candidate selected from the newly obtained image in step 94. That is, the area detection unit 22 determines that the user-associated area has been detected.

Accordingly, if the determination in step 96 is affirmative, the sequence proceeds to step 98, where the setting unit 20 obtains from the area detection unit 22 the central position and distribution range of the area having the maximum similarity, the area having been selected in step 94.

Figure 8:
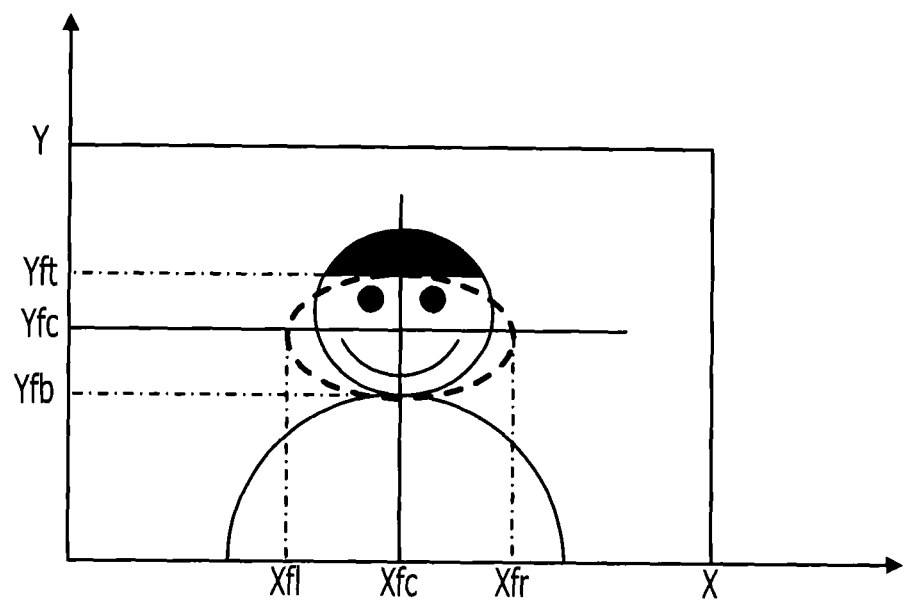
FIG. 8 is a conceptual drawing illustrating a determination as to whether a user-associated area protrudes beyond an image.

For example, if the color-histogram-using area is the overall face area, coordinates (Xfc, Yfc) illustrated in FIG. 8 are obtained as the central position of the area having the maximum similarity and end positions Xfl and Xfr in the X direction and end positions Yft and Yfb in the Y direction are obtained as the distribution range.

The setting unit 20 also calculates the position and size of the face area in the user-associated area from the central position and distribution range of the area having the maximum similarity, and stores calculation results in the first storage unit 28.

In step 100, the setting unit 20 determines whether the area having the maximum similarity, whose central position and distribution range were obtained in step 98, has a portion that protrudes beyond a boundary of the image. The area having the maximum similarity is the area used as the color-histogram-using area.

If, for example, the color-histogram-using area is the overall face area, the setting unit 20 determines in step 100 whether one of the end positions Xfl and Xfr in the X direction and the end positions Yft and Yfb in the Y direction is beyond a boundary of the image.

If the determination in step 100 is negative, the sequence returns to step 92, after which steps 92 to 100 are repeated. Thus, while the color histogram similarity obtained in step 94 is greater than or equal to the threshold TH, continuous authentication based on the color histogram similarity continues.

Each time the user changes his or her orientation during continuous authentication, the position of the user-associated area in the image changes. However, color histogram authentication is robust against changes in the orientation of the user, and the user-associated area may be highly precisely detected as long as the user-associated area is within the image.

However, if the change in the orientation of the user is comparatively large, part of the user-associated area in the image may protrude beyond a boundary of the image. Even if part of the area, which is used as the color-histogram-using area, in the user-associated area protrudes beyond a boundary of the image, detection of the user-associated area is not disabled immediately, but the color histogram similarity is lowered.

If an amount by which part of the area protrudes beyond the boundary of the image becomes large, the drop in the color histogram similarity becomes significant and the user-associated area may become unable to be detected.

Therefore, if the determination in step 100 is affirmative, the sequence proceeds to step 102. In step 102, the setting unit 20 extracts, as candidate areas, registration areas that are eligible as the color-histogram-using area and do not protrude past the boundaries of the image out of each registration area whose histogram has been stored in the first storage unit 28.

For example, if the user-associated area protrudes beyond the left-side boundary of the image, the setting unit 20 extracts a registration area located on the right side of the user-associated area as the candidate area. For example, the setting unit 20 extracts "area of stored data 3" or "area of stored data 6" illustrated in FIG. 6.

Depending on the orientation of the user, there may be a state in which the image includes no registration area, which is to be used as the color-histogram-using area, that is within the boundaries of the image. In this case, the setting unit 20 obtains a proportion of the amount of protrusion from a boundary of the image for each area used as a registration area, and selects, as candidate areas, one or more registration areas in ascending order of their registration ratios, starting from the registration area having the smallest ratio.

In step 104, the setting unit 20 selects one or more candidate areas from the candidate areas extracted in step 102, and changes the color-histogram-using area to one of the selected candidate areas. The one or more candidate areas may be selected in, for example, descending order of their color histogram similarity, starting from the candidate area having the largest similarity. Alternatively, the one or more candidate areas may be selected in descending order of their distance from a boundary of the image, starting from the candidate area having the longest distance.

Figure 9A:
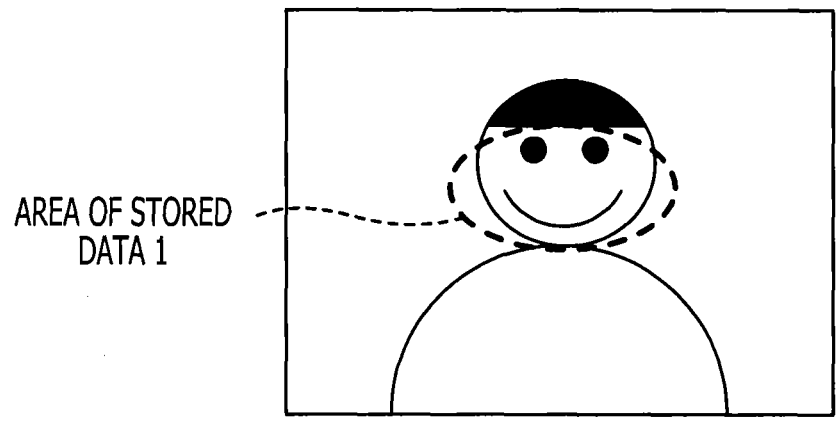
FIGS. 9A and 9B are conceptual drawings illustrating an example of changing a color-histogram-using area when a user-associated area protrudes beyond the image.

At the beginning of continuous authentication, for example, the area of stored data 1, which covers the overall face area, is set as the color-histogram-using area, as illustrated in FIG. 9A. The area used as the color-histogram-using area is often located at the center of the image.

Figure 9B:
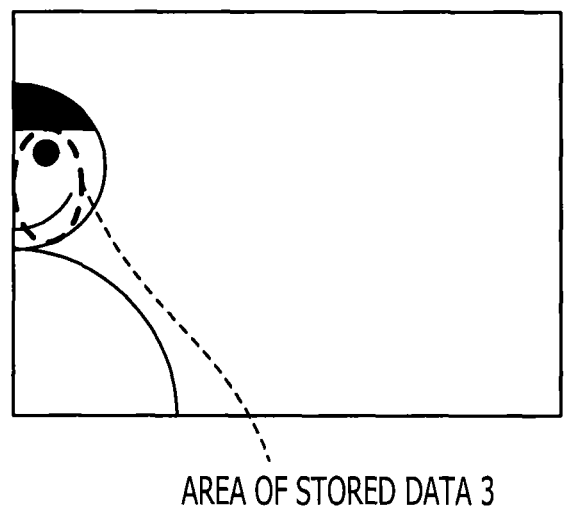

If part of the overall face area protrudes beyond a boundary of the image due to a change in the orientation of the user as illustrated in FIG. 9B, the color-histogram-using area is changed to a registration area that has no protrusion from a boundary of the image. FIG. 9B illustrates an example in which part of the overall face area used as the color-histogram-using area protrudes beyond the left-side edge of the image and the color-histogram-using area has been thereby changed to the area of stored data 3, which is located on the right side of the user-associated area.

Upon completion of the processing in step 104, the sequence returns to step 92, after which steps 92 to 100 are repeated with the new color-histogram-using area. Thus, even if part of an area, on the image, that is used as the color-histogram-using area protrudes beyond a boundary of the image, the color-histogram-using area is changed, which may suppress color histogram similarity from being lowered. Accordingly, it may be possible to suppress becoming unable to detect the user-associated area.

If the similarity of the color histogram obtained in step 94 is less than the threshold TH, the determination in step 96 becomes negative and the sequence proceeds to step 106. In step 106, the area detection unit 22 outputs a determination result indicating that the user has moved away from the information device.

In step 108, the area detection unit 22 locks the use of the information device or performs other usage limiting processing, and terminates the continuous authentication processing. When the user who temporarily moved away from the information device uses the information device again, login authentication as described above is carried out again.

Second Embodiment

Next, a second embodiment of the technology in the present disclosure described. The structure in the second embodiment is the same as the structure in the first embodiment, so elements that are the same as in the first embodiment will be given the same reference numerals and the descriptions of the structure in the second embodiment are omitted. The effect of the second structure is described below.

Color authentication is problematic in that if the size of the color-histogram-using area is small, the amount of information for the color histogram may be insufficient and the user-associated area may be thereby more likely to be mistakenly detected. In the second embodiment, therefore, the size of each registration area is calculated and is stored in the first storage unit 28 in association with the color histogram of the registration area when the color histogram of each registration area is stored in the first storage unit 28 in initial registration processing, as illustrated in FIG. 10. The size is, for example, the number of pixels.

Figure 11:
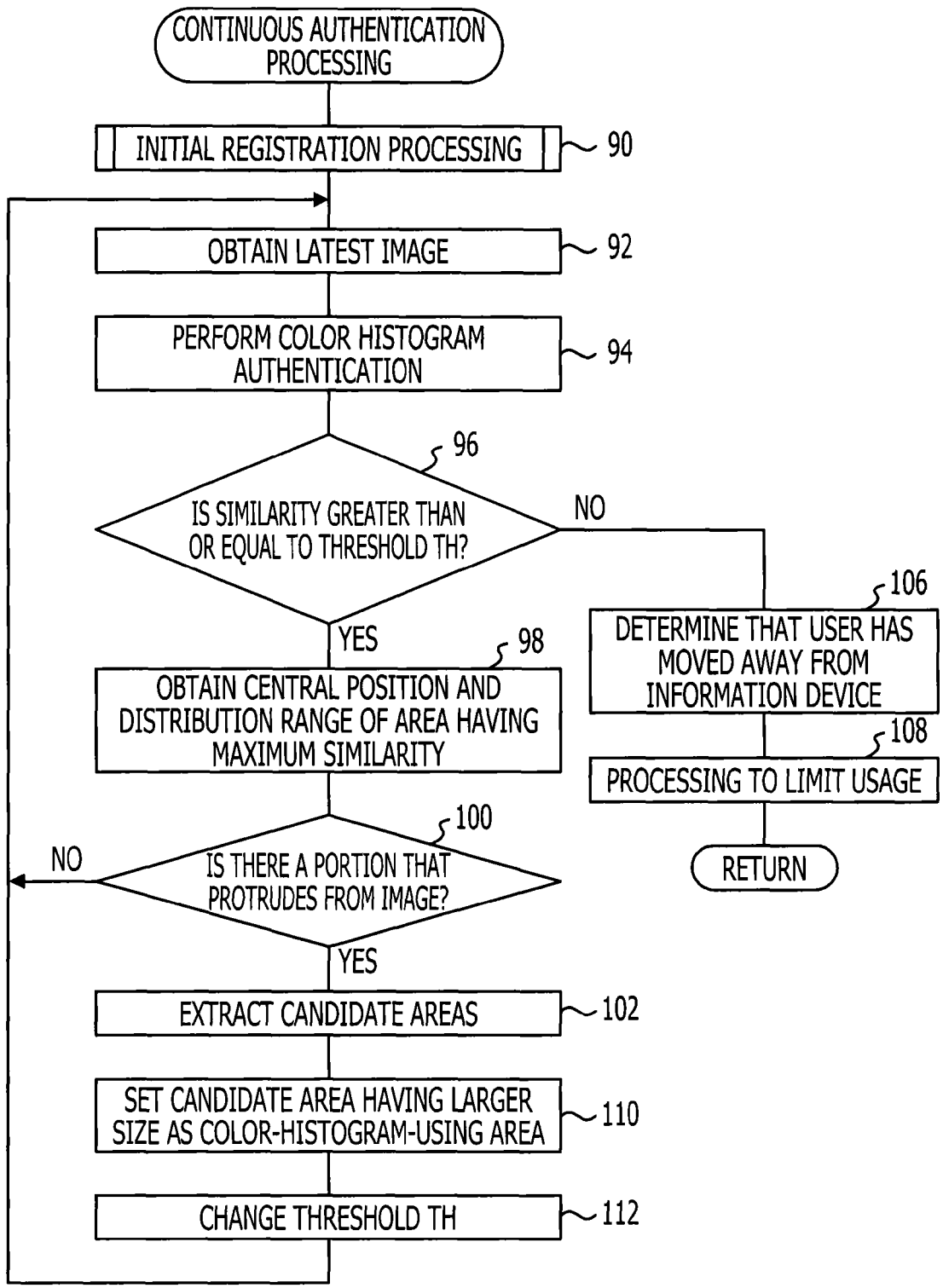
FIG. 11 is a flowchart of continuous authentication processing described in the second embodiment.

Next, continuous authentication processing according to the second embodiment will be described with reference to FIG. 11, focusing only on portions different from continuous authentication processing, illustrated in FIG. 4, according to the first embodiment.

In continuous authentication processing according to the second embodiment, if part of the area having the maximum similarity protrudes beyond a boundary of the image (the result in step 100 is Yes), registration areas, which are to be used as the color-histogram-using area, that are within the boundaries of the image are extracted as candidate areas (step 102). The sequence then proceeds to step 110.

In step 110, the setting unit 20 selects one or more candidate areas from at least one candidate area extracted in step 102, in descending order of size, starting from the candidate area having the largest size. The setting unit 20 then changes the color-histogram-using area to one of the selected candidate areas.

In step 112, the setting unit 20 changes the threshold TH of color histogram similarity according to the ratio between the size S1 of the old color-histogram-using area and the size S2 of the new color-histogram-using area. The threshold TH may be changed according to, for example, equation (2) below.

$$TH = TH \times (S2/S1) \qquad (2)$$

Although, in equation (2), the threshold TH is changed according to the ratio of the size S2 to the size S1, the method of changing the threshold TH is not limited to this method. For example, if the size S1 is greater than or equal to the size S2, a fixed value or a value according to a difference between the sizes S1 and S2 may be subtracted from the threshold TH. Alternatively, if the size S1 is less than the size S2, a fixed value or a value according to a difference between the sizes S1 and S2 may be added to the threshold TH.

As described above, in the second embodiment, an area with a larger size is selected as the color-histogram-using area. Accordingly, an insufficiency of the amount of information used in calculation of color histogram similarity may be suppressed, which may suppress precision in similarity calculation from being lowered. Since the threshold TH is changed according to the ratio of the size S2 of the new color-histogram-using area to the size S1 of the old color-histogram-using area, failing to detect the user-associated area in spite of the user being present may be suppressed.

Third Embodiment

Next, a third embodiment of the technology in the present disclosure is described. Elements that are the same as in the first and second embodiments are given the same reference numerals and repeated description thereof is omitted.

Figure 12:
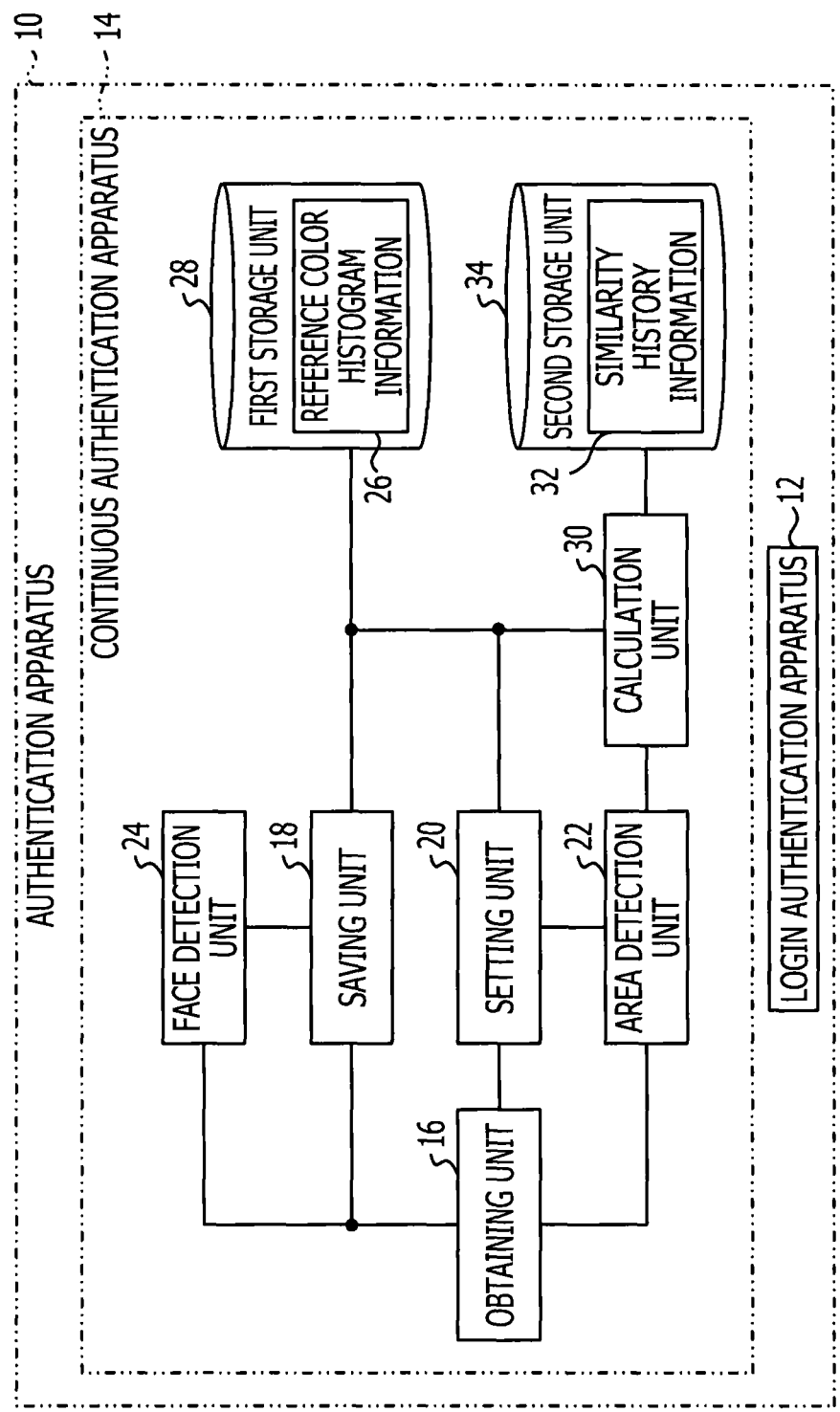
FIG. 12 is a functional block diagram of an authentication apparatus described in a third embodiment.

FIG. 12 is a functional block diagram of the authentication apparatus 10 according to the third embodiment. The third embodiment differs from the first and second embodiments in that the continuous authentication apparatus 14 further includes a calculation unit 30 and a second storage unit 34 that stores similarity history information 32. The calculation unit 30 calculates color histogram similarity for each registration area each time an image is obtained by the obtaining unit 16. The calculation unit 30 also stores similarity calculated for each registration area in the second storage unit 34 as the similarity history information 32.

In the third embodiment, an upper limit is set for the number of color histogram similarities, calculated for one registration area, that may be stored in the second storage unit 34 as the similarity history information 32. When the number of similarities stored in the second storage unit 34 reaches the upper limit, the calculation unit 30 deletes, from the second storage unit 34, a similarity that was stored at the oldest time to make an available space used to store a new similarity in the second storage unit 34.

When the authentication apparatus 10 according to the third embodiment is implemented by the computer 42 illustrated in FIG. 2, the continuous authentication program 62 according to the third embodiment further includes a similarity calculation process 74 as indicated by dashed lines in FIG. 2. In this case, the CPU 44 executes the similarity calculation process 74 to operate as the calculation unit 30 illustrated in FIG. 12. When the authentication apparatus 10 according to the third embodiment is implemented by the computer 42 illustrated in FIG. 2, the storage unit 48 further stores the similarity history information 32. In this case, the storage unit 48, which stores the similarity history information 32, doubles as the second storage unit 34, and a partial area in the memory 46 is used as an area that stores the similarity history information 32.

Next, the effect of the third embodiment is described. When color histogram similarity is repeatedly calculated by using the reference color histograms of different registration areas, each registration area has a different similarity trend. In some registration areas, similarity may change to a large degree.

The reasons for this is that in addition to changes in the orientation of the user, color histogram similarity is affected by, for example, changes in information about the colors of the image that are caused by changes in the state of environmental light. The degree of effect is not standard across the surface of the image.

When the color-histogram-using area is changed to a registration area in which color histogram similarity is high on average and the trend of similarity is stable, improved precision in subsequent color histogram authentication is likely to be high.

In the third embodiment, the calculation unit 30 calculates color histogram similarity for each registration area whose reference color histogram has been stored in the first storage unit 28. The calculation unit 30 then repeatedly calculates and stores a similarity for each registration area in the second storage unit 34.

Figure 13:
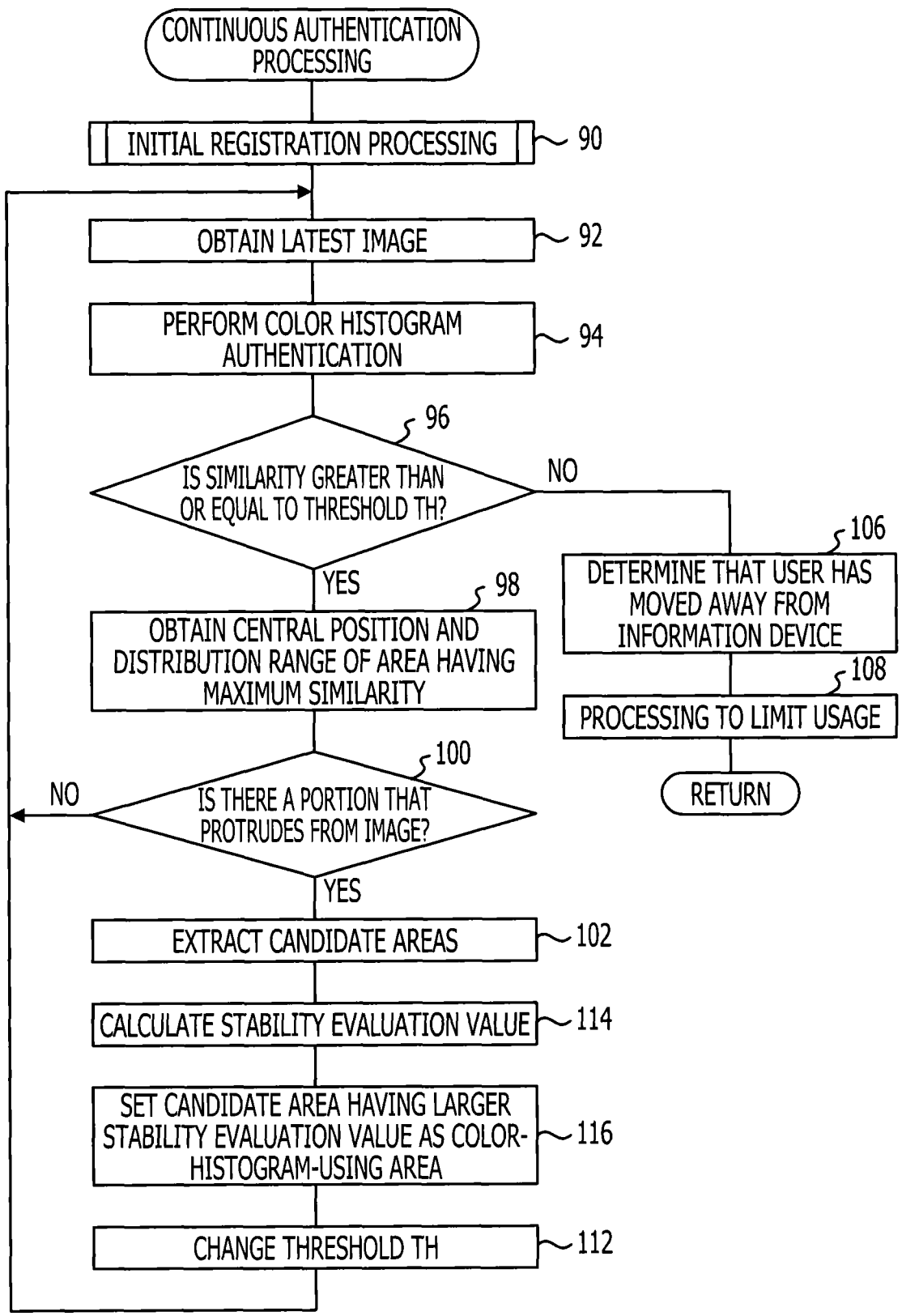
FIG. 13 is a flowchart of continuous authentication processing described in the third embodiment.

Next, continuous authentication processing according to the third embodiment is described with reference to FIG. 13, focusing on only portions different from continuous authentication processing described in the second embodiment with reference to in FIG. 11. In continuous authentication processing according to the third embodiment, if part of the area having the maximum similarity protrudes beyond a boundary of the image (the determination in step 100 is affirmative), registration areas, which are to be used as the color-histogram-using area, that are within the boundaries of the image are extracted as candidate areas (step 102). The sequence then proceeds to step 114.

In step 114, the setting unit 20 obtains information that indicates a trend of color histogram similarity in a fixed period t for each candidate area extracted in step 102, the information being obtained from the similarity history information 32 stored in the second storage unit 34. The setting unit 20 also calculates, for each candidate area extracted in step 102, a stability evaluation value according to which the stability of the color histogram similarity in the fixed period t is evaluated.

FIG. 14A illustrates an example of trends of color histogram similarity of different candidate areas in the fixed period t. In FIG. 14A, the area of stored data 2, which is on the left side of the face area, the area of stored data 5, which is on the left side of the body area, and the area of stored data 7, which is the head area, have been extracted as candidate areas.

FIG. 14B indicates the average μ and the standard deviation 6 of the color histogram similarities in the period t for each candidate area. The stability evaluation value s may be obtained from the average μ and the standard deviation 6 according to equation (3) below.

$$s = \mu - \sigma \quad (3)$$

FIG. 14B also indicates results of calculating the stability evaluation value s. As is clear from equation (3), the higher the average μ is, the higher the stability evaluation value s is, and the lower the standard deviation σ is, the higher the stability evaluation value s is. Accordingly, a candidate area in which color histogram similarity is high on average and the trend of similarity is stable may be identified according to the stability evaluation value s. In equation (3), the variance $\sigma^2$ may be used instead of the standard deviation σ.

In step 116, the setting unit 20 selects one or more candidate areas in descending order of stability evaluation values, as s calculated in step 114, from the candidate areas extracted in step 102, starting from the candidate area having the largest stability evaluation value. The setting unit 20 then changes the color-histogram-using area to one of the selected candidate areas. In the example in FIGS. 14A and 14B, for example, at least the area of stored data 2, in which the stability evaluation value s is highest, is selected. In addition, the area of stored data 2 is set as the color-histogram-using area.

As described above, in the third embodiment, since a registration area having a larger stability evaluation value s is selected as the color-histogram-using area, it is possible to suppress a lowering of precision with which the user-associated area is detected, where the lowering of precision is affected by, for example, changes in information about the colors of the image that are caused by changes in the state of environmental light.

Fourth Embodiment

Next, a fourth embodiment of the technology in the present disclosure will be described. The structure in the fourth embodiment is the same as the structure in the third embodiment, so elements that are the same as in the third embodiment are given the same reference numerals and the descriptions of the structure in the fourth embodiment are omitted. The effect of the fourth structure is described below.

As described above, color histogram similarity changes due to, for example, changes in the orientation of the user or changes in information about the colors of the image that are caused by changes in the state of environmental light. Since the orientation of the user and the state of environmental light change over time, emphasizing the stability evaluation value s in the most recent period is preferable.

Continuous authentication processing according to the fourth embodiment is described below with reference to FIG. 15, focusing on only portions that are different from continuous authentication processing, illustrated in FIG. 13, according to the third embodiment.

In continuous authentication processing according to the fourth embodiment, if part of the area having maximum similarity protrudes beyond a boundary of the image (the determination in step 100 is affirmative), registration areas that are within the boundaries of the image are extracted as candidate areas (step 102). The sequence then proceeds to step 118.

In step 118, for each candidate area extracted in step 102, the setting unit 20 obtains information that indicates the trend of color histogram similarity in the fixed period t, the information being obtained from the similarity history information 32 stored in the second storage unit 34. The setting unit 20 also divides the fixed period t into a plurality of periods for each extracted candidate area, according to the obtained information. The setting unit 20 then calculates the stability evaluation value s for each divided period, according to equation (3) described above.

FIG. 16A illustrates trends of color histogram similarity of different candidate areas in the fixed period t. In FIG. 16A, the area of stored data 2, which is on the left side of the face area, the area of stored data 5, which is on the left side of the body area, and the area of stored data 7, which is the head area, have been extracted as candidate areas.

FIG. 16B illustrates, for each candidate area, stability evaluation values s1 to s3 of color histogram similarity in a plurality of periods t1 to t3, into which the period t has been divided.

In step 120, the setting unit 20 calculates, for each candidate area, an overall stability evaluation value s0 from the stability evaluation values s1 to s3 for color histogram similarity in the periods t1 to t3 according to equation (4) below $$s0 = s1 \times w1 + s2 \times w2 + s3 \times w3 + \quad (4)$$

In equation (4), w1, w2, and w3 are weighting factors for individual periods; the sum of w1, w2, and w3 is 1. These weighting factors may be set so that the more recent the period is, the larger the weight is (for example, w1 is 0.2, w2 is 0.3, and w3 is 0.5). FIG. 16B also indicates a calculation result of the overall stability evaluation value s0 when w1 is 0.2, w2 is 0.3, and w3 is 0.5.

Accordingly, it is possible to identify, from the overall stability evaluation value s0, a candidate area in which color histogram similarity is high on average and the trend of similarity is stable particularly in the most recent period.

Although the fixed period has been divided into three periods, this is not a limitation; the fixed period may be divided into another number of periods. Even if the fixed period is divided into another number of periods, weighting factors in the divided periods may still be set so that the more recent the period is, the larger the weight is.

In step 122, the setting unit 20 selects from the candidate areas extracted in step 102, which have been calculated in step 120, one or more candidate areas in descending order of their overall evaluation values s0 of stability, starting from the candidate area having the largest overall evaluation value s0. The setting unit 20 then changes the color-histogram-using area to one of the selected candidate areas.

In the example in FIGS. 16A and 16B, for example, at least the area of stored data 2, in which the overall stability evaluation value s0 is maximized, is selected and is set as the color-histogram-using area.

As described above, in the fourth embodiment, since a registration area having a large overall stability evaluation value s0 is selected as the color-histogram-using area, it may be possible to minimize effects due to the most recent changes in the orientation of the user, the state of environmental light, and the like. Accordingly, precision with which the user-associated area is detected may be improved.

When continuous authentication processing according to the above embodiments is started, the color histogram of the face area extracted by the face detection unit 24, the color histogram of the body area identified from the face area, and the color histograms of areas obtained by dividing the face area and body area are registered as reference color histograms. However, this is not a limitation.

For example, if the login authentication apparatus 12 is structured so that it performs, as login authentication, face authentication in which whether the face of the user to be authenticated matches the face of a legitimate user registered in advance is determined, the reference color histograms may be stored according to the extraction result obtained from the face area in the face authentication. In this case, the structure of the continuous authentication apparatus 14 may be simplified by removing the face detection unit 24.

Although, in the above embodiments, a color histogram for each registration area is created in initial registration processing and is stored in the first storage unit 28 as the reference color histogram information 26, this is not a limitation.

For example, the color histogram of each registration area may be created again after a fixed time has elapsed, when a continuous change in the luminance of the overall image is detected, or at another time, and the reference color histogram information 26 may be updated.

Although, in the above embodiments, a registration area to be set as the color-histogram-using area is selected according to the size of the area in the second embodiment, according to the stability evaluation value s in the third embodiment, and according to the overall evaluation value s0 in the fourth embodiment, this is not a limitation; a combination of the size, stability evaluation value s, and overall evaluation value s0 may be used.

For example, a registration area may be selected according to another evaluation value that increases as the average color histogram similarity increases, the standard deviation $\sigma$ decreases, and the size of the registration area increases. Alternatively, when there are a plurality of registration areas in which the stability evaluation value s and the overall evaluation value s0 have the same value or their difference is not greater than a given value, registration areas may be selected from the plurality of registration areas in descending order of their sizes.

In the above embodiment, when the area used as the color-histogram-using area shifts from a first state in which the area is within the boundaries of the image to a second state in which the area protrudes beyond a boundary of the image, the color-histogram-using area changes. However, the color-histogram-using area may also change when the color-histogram-using area shifts from the second state to the first state.

For example, monitoring of whether an area protrudes from a boundary of the image is performed for all registration areas; when a registration area that has shifted from the second state to the first state is detected, if the area satisfies a given condition, the area may be set as the color-histogram-using area. The given condition is, for example, that the registration area that has shifted from the second state to the first state has a larger size, a larger stability evaluation value s, or a larger overall evaluation value s0 than the current color-histogram-using area.

In the above embodiments, after login authentication, the technology in the present disclosure is applied to continuous authentication in which whether the user who was subject to login authentication continues to use the information device is determined. However, the technology in the present disclosure is not limited to the above aspect. For example, in an aspect in which a video or voice is reproduced or an application program is executed only while the user is currently using the information device and the reproduction of a video and the like and other similar functions are stopped when the user has moved away from the information device, the technology in the present disclosure may be applied to determine whether the user is present or absent.

In the above embodiments, an aspect in which the continuous authentication program 62 is stored (installed) in the storage unit 48 in advance has been described, but this is not a limitation. The continuous authentication program 62 may also be provided by being recorded on a computer-readable recording medium such as a compact disc-read-only memory (CD-ROM) or a digital versatile disc read-only memory (DVD-ROM).

All literature, patent applications, and technical standards cited in this description are incorporated into this description by reference to the same extent as when the incorporation of individual literature, patent applications, and technical standards by reference is described specifically and individually.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An apparatus comprising:
a memory; and
a processor coupled to the memory and configured to:
acquire a first image captured by an image capturing device,
extract a first area corresponding to an object in the first image,
divide the first area into a plurality of first segments,
generate a plurality of histograms regarding the plurality of first segments respectively,
store the plurality of histograms into the memory,
acquire a second image which is captured by the image capturing device after the first image, detect a second area corresponding to the object in the second image according to a first reference histogram from among the plurality of histograms, determine whether a part of the object is outside of the second image based on the second area, when it is determined that the part of the object is outside of the second image, select a second reference histogram used for a third image which is captured by the image capturing device after the second image, from among the plurality of histograms, and when the third image is acquired, detect a third area corresponding to the object in the third image based on the second reference histogram.

2. The apparatus according to claim 1, wherein the processor is configured to:

identify a segment corresponding to another part of the object which is included in the second image when it is determined that the part of the object is outside of the second image, and select the second reference histogram that corresponds to the identified segment.

3. The apparatus according to claim 1, wherein the processor is configured to store information about a size of each of the plurality of segments into the memory, the second reference histogram is selected based on the information about the size.

4. The apparatus according to claim 1, wherein the processor is configured to detect the second area when a similarity between the first reference histogram and a histogram generated based on the second image is greater than or equal to a threshold.

5. The apparatus according to claim 4, wherein the processor is configured to change the threshold to another threshold according to the relationship between a size of a first segment corresponding to the first reference histogram and another size of a second segment corresponding to the second reference histogram.

6. The apparatus according to claim 1, wherein the processor is configured to:

calculate a plurality of similarities between the first reference histogram and each of a plurality of images including the second image and an image captured before the second image is captured, and store the plurality of similarities into the memory, the second reference histogram is selected according to an average of the plurality of similarities.

7. The apparatus according to claim 1, wherein the processor is configured to:

calculate a plurality of similarities between the first reference histogram and each of a plurality of images including the second image and an image captured before the second image is captured, store the plurality of similarities into the memory, calculate, for each of the plurality of segments in the first image, an evaluation value obtained by assigning a weight to similarity of an image or images that were obtained more recently according to trends of the plurality of similarities, and select the second reference histogram according to the evaluation value.

8. A method executed by a computer, the method comprising:

acquiring a first image captured by an image capturing device;

extracting a first area corresponding to an object in the first image, dividing the first area into a plurality of first segments, generating a plurality of histograms regarding the plurality of first segments respectively, storing the plurality of histograms into the memory, acquiring a second image which is captured by the image capturing device after the first image, detecting a second area corresponding to the object in the second image according to a first reference histogram from among the plurality of histograms, determining whether a part of the object is outside of the second image based on the second area, when it is determined that the part of the object is outside of the second image, selecting a second reference histogram used for a third image which is captured by the image capturing device after the second image, from among the plurality of histograms, and when the third image is acquired, detecting a third area corresponding to the object in the third image based on the second reference histogram.

9. The method according to claim 8, further comprising identifying a segment corresponding to another part of the object which is included in the second image when it is determined that the part of the object is outside of the second image, and selecting the second reference histogram that corresponds to the identified segment.

10. The method according to claim 8, further comprising:

storing information about a size of each of the plurality of segments into the memory, selecting the second reference histogram based on the information about the size.

11. The method according to claim 8, further comprising:

detecting the second area when a similarity between the first reference histogram and a histogram generated based on the second image is greater than or equal to a threshold.

12. The method according to claim 11 further comprising:

changing the threshold to another threshold according to the relationship between a size of a first segment corresponding to the first reference histogram and another size of a second segment corresponding to the second reference histogram.

13. The method according to claim 8, further comprising:

calculating a plurality of similarities between the first reference histogram and each of a plurality of images including the second image and an image captured before the second image is captured;

storing the plurality of similarities into the memory; and selecting the second reference histogram according to an average of the plurality of similarities.

14. The method according to claim 8, further comprising:

calculating a plurality of similarities between the first reference histogram and each of a plurality of images including the second image and an image captured before the second image is captured;

storing the plurality of similarities into the memory;

calculating, for each of the plurality of segments in the first image, an evaluation value obtained by assigning a weight to similarity of an image or images that were obtained more recently according to trends of the plurality of similarities; and selecting the second reference histogram according to the evaluation value.

15. A computer-readable recording medium storing a program that causes a computer to execute a process to detect a user, the process comprising:

acquiring a first image captured by an image capturing device;

extracting a first area corresponding to an object in the first image, dividing the first area into a plurality of first segments, generating a plurality of histograms regarding the plurality of first segments respectively, storing the plurality of histograms into the memory, acquiring a second image which is captured by the image capturing device after the first image, detecting a second area corresponding to the object in the second image according to a first reference histogram from among the plurality of histograms, determining whether a part of the object is outside of the second image based on the second area, when it is determined that the part of the object is outside of the second image, selecting a second reference histogram used for a third image which is captured by the image capturing device after the second image, from among the plurality of histograms, and when the third image is acquired, detecting a third area corresponding to the object in the third image based on the second reference histogram.

16. The apparatus according to claim 1, wherein the object is a user to be authenticated.

17. The method according to claim 8, wherein the object is a user to be authenticated.

18. The computer-readable recording medium according to claim 15, wherein the object is a user to be authenticated.

\* \* \* \* \*